United States Patent [19]

Bonewicz, Jr. et al.

[11] Patent Number: 4,887,837
[45] Date of Patent: Dec. 19, 1989

[54] CARRIER FOR USE ON BEACHES, ETC.

[75] Inventors: Theodore J. Bonewicz, Jr.; Henry S. Leichter, both of Philadelphia, Pa.

[73] Assignee: Al-Mar Precision Co., Philadelphia, Pa.

[21] Appl. No.: 266,320

[22] Filed: Oct. 31, 1988

Related U.S. Application Data

[63] Continuation-in-part of Ser. No. 58,064, Jun. 4, 1987, abandoned.

[51] Int. Cl.$^4$ .............................................. B62B 1/04
[52] U.S. Cl. .................................... 280/654; 108/129; 280/47.24; 280/47.26; 280/659
[58] Field of Search ............ 280/652, 654, 659, 47.29, 280/47.24, 47.26, 655; 108/129, 132

[56] References Cited

U.S. PATENT DOCUMENTS

| | | | |
|---|---|---|---|
| 2,957,700 | 10/1960 | Beaurline | 280/654 |
| 3,043,603 | 7/1962 | Major, Sr. | 280/40 |
| 3,155,364 | 11/1964 | Berg | 108/129 |
| 3,679,227 | 7/1972 | Rock | 280/47.33 |
| 3,907,370 | 9/1975 | Bard | 301/63 PW |
| 3,947,054 | 3/1976 | Hall | 280/36 C |
| 3,998,476 | 12/1976 | Kazmark, Sr. | 280/655 |
| 4,037,858 | 7/1977 | Adams | 280/652 |
| 4,130,320 | 12/1978 | Scardenzan | 301/63 PW |
| 4,286,796 | 9/1981 | Esposito | 280/47.27 |
| 4,404,915 | 9/1983 | Simpson | 108/129 |
| 4,452,468 | 6/1984 | Eads et al. | 280/47.29 |
| 4,523,773 | 6/1985 | Holtz | 280/654 |
| 4,562,212 | 1/1986 | Orlandino et al. | 280/649 |
| 4,601,519 | 7/1986 | D'Andade | 301/41 R |
| 4,630,837 | 12/1986 | Kazmark | 280/47.29 |

FOREIGN PATENT DOCUMENTS

| | | | |
|---|---|---|---|
| 2354231 | 1/1978 | France | 280/652 |
| 345131 | 4/1960 | Switzerland | 108/129 |

Primary Examiner—Charles A. Marmor
Assistant Examiner—Eric Culbreth
Attorney, Agent, or Firm—Caesar, Rivise, Bernstein, Cohen & Pokotilow

[57] ABSTRACT

A cart for transporting objects onto beaches or other soft surfaces. The cart comprises a frame, a pivotable support platform, and at least two wheels. The frame includes a pair of elongated side rail members each having an upper end portion including a handle extending therebetween and a lower end portion through which an axle passes. The pair of wheels is mounted on the axle. The pivotable support platform comprises a generally planar plastic member having a pair of sides. A pair of pivot rods are provided to establish a horizontal pivot axis. The rods are coupled to the sides of the platform to enable it to be pivoted about that axis from a storage position wherein the platform is substantially flush with the frame to an operative position wherein the platform extends substantially perpendicularly to the frame. The platform includes a pair of cantilever brackets disposed therebelow and integrally molded therewith. Each of the brackets includes an elongated section having a channel with beads therein and being adapted to snap fit a respective one of the side rails therein to hold the platform in its operative position, whereupon objects can be placed thereon. The platform also comprises at least one support leg pivotably connected, which may be fitted into a beaded channel, thereto to enable the platform to assume a substantially horizontal position for loading it with the objects. The cart also includes an umbrella holder and a hanger for articles or alternatively a large carrying bag may be fitted over and attached to the frame of the cart.

3 Claims, 4 Drawing Sheets

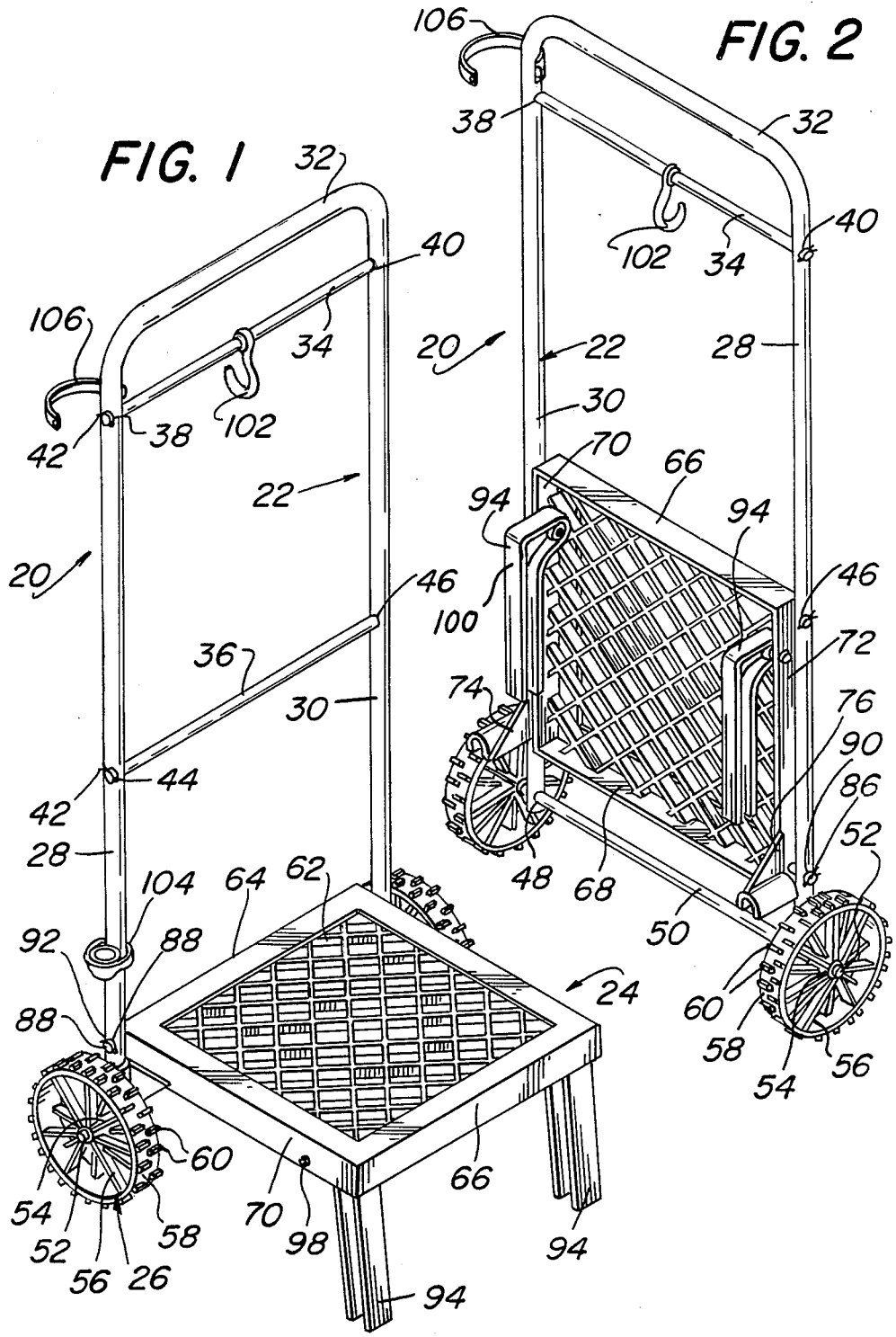

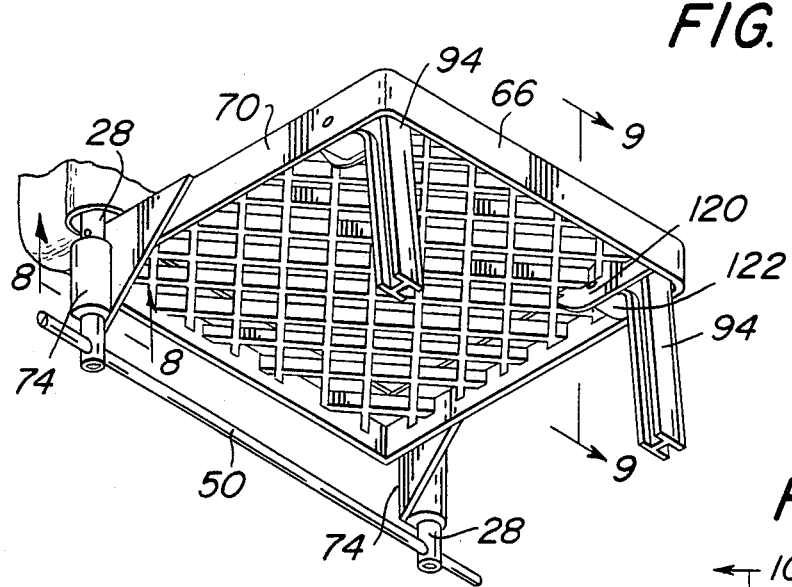
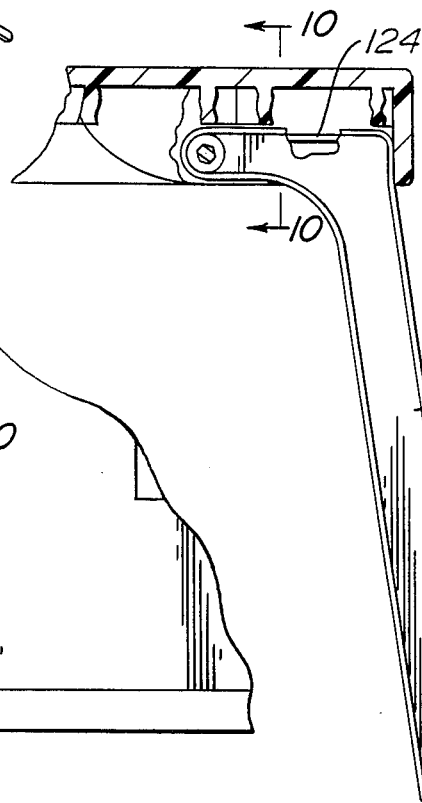
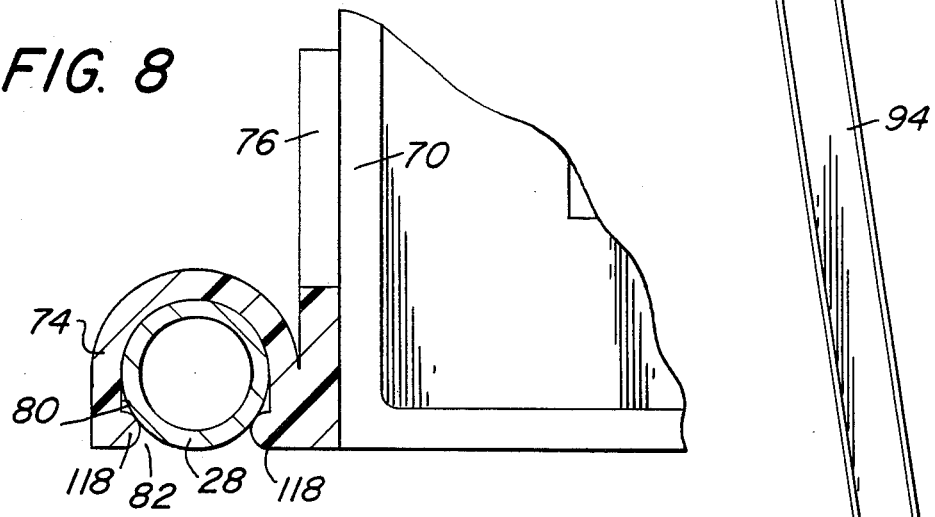

CARRIER FOR USE ON BEACHES, ETC.

BACKGROUND OF THE INVENTION

This is a continuation-in-part of patent application entitled Carrier For Use On Beaches, Etc., application Ser. No. 07/058,064 now abandoned, filed 6/4/87.

This invention relates generally to hand trucks or carts and particularly to a hand cart having an extendable platform which may be used for transporting personal items or equipment on beaches or other soft surfaces.

Various hand trucks or carts have been disclosed in the patent literature and are commercially available for transporting or carrying luggage or other personal items. Examples of such prior art devices are found in U.S. Pat. Nos. 4,286,796 (Esposito), 4,037,858 (Adams), 3,998,476 (Kazmark), 3,947,054 (Hall), and 3,043,603 (Major, Sr.).

Such devices while generally suitable for their intended purposes, all suffer from one or more of the following drawbacks: strength, collapsibility, complexity, small capacity. Moreover, such devices are not particularly suitable for transporting objects onto beaches or other soft surfaces, inasmuch as the wheels thereof appear too small to avoid sinking into the sand or other material forming the surface.

OBJECTS OF THE INVENTION

Accordingly, it is a general object of the instant invention to provide a hand truck/cart which overcomes the disadvantages of the prior art.

It is a further object of the instant invention to provide a hand truck/cart including a collapsible base in which it is particularly suited for transporting objects onto soft surfaces.

It is still a further object of the instant invention to provide a hand truck/cart which is simple in construction, relatively light in weight, yet sturdy.

It is still a further object of this invention to provide a hand truck/cart including a collapsible base portion and supporting means therefor.

It is still a further object of this invention to provide a hand truck/cart including a collapsible base portion with a frame upon which a large bag may be mounted for carrying objects.

It is still a further object of this invention to provide a hand truck/cart with a collapsible base portion which locks positively into position when the base portion is lowered for use.

It is still a further object of this invention to provide a hand truck/cart with a collapsible base portion with retractable legs which lock firmly in position when the legs are extended.

It is still a further object of this invention to provide a hand truck/cart with a collapsible base portion and wheels which are cleated and sized for traction on soft sand, earth, or snow.

SUMMARY OF THE INVENTION

These and other objects of the instant invention are achieved by providing a cart for transporting objects onto beaches or other soft surfaces. The cart comprises a frame, a pivotable support platform and at least two wheels. The frame includes a pair of elongated side rail members each having an upper end portion including handle means and a lower end portion through which an axle passes. The wheels are mounted on the axle. The pivotable support platform comprises a generally planar member having a pair of sides. Pivot means are provided to establish a horizontal pivot axis and such means is coupled to the sides of the support platform to enable it to be pivoted about the horizontal pivot axis from a storage position, wherein the platform is substantially flush with the frame, to an operative position, wherein the platform extends substantially perpendicularly to the frame. The platform also includes a pair of cantilever brackets disposed therebelow. Each of the brackets includes an elongated section having a channel therein and is adapted to receive in it a respective one of the elongated side rails to hold the platform in its operative position so that objects can be placed on the platform and solidly supported thereby.

The channels of the platform brackets may be beaded to assure a positive locking action which snaps the platform into its operative position.

Attached to the platform are retractable legs, which have a portion which fits into channels in the underside of the platform when the legs are extended for use. The channels may also be beaded to assure a positive locking action when the legs are extended. A large bag may be attached to the frame to carry additional objects and an elastic cord may be used to hold the cart in its collapsed position during storage and to prevent objects from slipping off the platform when the cart is in use.

This invention will be readily appreciated as the same becomes better understood by reference to the following detailed description when considered in connection with the accompanying drawings.

DESCRIPTION OF THE DRAWINGS

FIG. 1 is a perspective view of a hand truck/cart constructed in accordance with the subject invention and shown in its orientation arranged to be loaded with objects;

FIG. 2 is a perspective view of the hand truck/cart shown in FIG. 1 but shown in its collapsed condition wherein it is suitable for compact storage;

FIG. 7 is a perspective view of a portion of the hand truck/cart shown in FIG. 6, which shows details of the underside of its platform;

FIG. 8 is an enlarged sectional view taken along the line 8—8 of FIG. 7;

FIG. 9 is a partially exposed enlarged sectional view taken along the lines 9—9 of FIG. 7.

DETAILED DESCRIPTION OF THE PREFERRED EMBODIMENT

Figure 3:
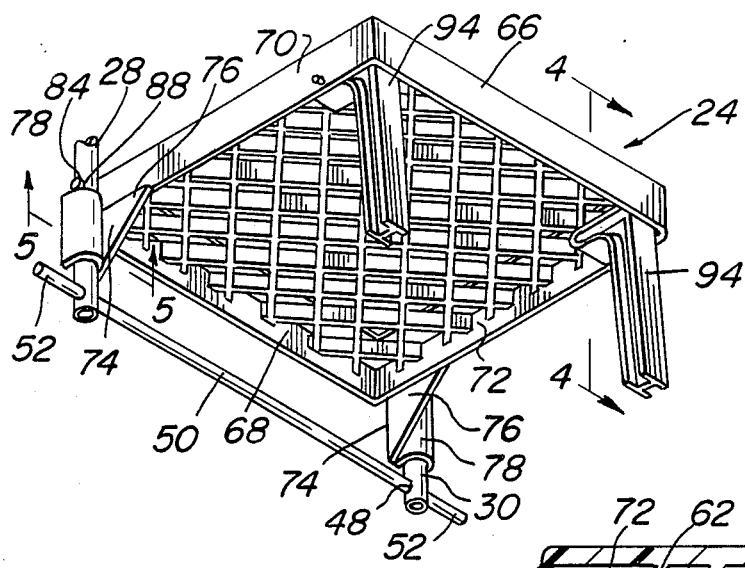
FIG. 3 is a perspective view of a portion of the hand truck/cart shown in FIG. 1 and showing details of the underside of its platform.

Referring now in greater detail to the various figures of the drawings wherein like reference characters refer to like parts, there is shown at 20 a hand truck/cart, which is suitable for carrying objects on beaches or other soft surfaces, e.g., soil, grass, etc.

The hand truck/cart basically comprises a frame 22, a pivotable support platform 24 and a pair of wheels 26.

The frame is a generally U-shaped member having a pair of elongated vertically oriented side rails 28 and 30 connected to their respective upper ends via a bridging section or handle 32. A pair of braces, in the form of respective elongated rods, 34 and 36, extend between the side rails 28 and 30, with the rod 34 being located adjacent the handle 32 and with the rod 36 being located at a height of the side rails 28 and 30 less than the length of the platform 24 (i.e., its dimension measured from its front edge to its rear edge). The rods 34 and 36 are held secured to the side rails by inserting their respective ends into aligned holes in the side rails 28 and 30. Thus, one end of rod 34 is disposed in a hole 38 at the upper end of the side rail 20 while the other end of the rod 38 is disposed within an axially aligned hole 40 in the side rail 30. To prevent the rod 34 from sliding out of the holes 38 and 40 a cotter pin 42 extends through a hole (not shown) at each end of the rod 34. The rod 36 is similarly connected to the side rails 28 and 30 by disposing one of its ends 36 within a hole 44 in the side rail 28 while its other end is disposed within a hole 46 in the side rail 30. The rod 36 is also prevented from sliding out of the holes via the use of cotter pins 42 in the same manner as that described with reference to rod 34.

In accordance with the preferred embodiment of the invention, the frame portion defined by the side rails 28 and 30 and the handle 32 are formed as an integral unit of a relatively lightweight, tubular stock material, such as aluminum, or any other suitable metal or plastic. The rods 34 and 36 are also formed of aluminum or some other suitable metal or plastic.

As can be seen clearly in FIGS. 2 and 3 the lower end of each of the side rails 28 and 30 includes a hole 48 therein. The hole 48 serves as a means for supporting and mounting the axle 50 for the wheels 26. The axle 50 basically comprises an elongated rod-like element formed of a lightweight, yet relatively strong, material, such as aluminum, steel or a suitable plastic, and extends through the opening 48 so that a substantial length portion 52 of the axle extends beyond each of the side rails. The extending portion 52 serves as the means for directly supporting the wheels 26 thereon.

As can be seen, each wheel 26 includes a central hub 54 having an opening (not shown) through which the axle portion 52 extends, and a plurality of spokes 56 radiating therefrom. The spokes terminate at their outer ends in a circular tread portion 58 having a plurality of segmented cleats 60 equidistantly spaced about the periphery thereof. The cleats 60 are arranged in a staggered, interleaved, orientation parallel to the axle 50 and each extends for approximately half the width of the wheels. The tread portion 58 of each wheel is sufficiently wide so that it will not sink deeply into sand or other soft material. The parallel orientation of the cleats 60 ensures that good traction is effected as the wheel rolls along the sand or other soft material. In accordance with the preferred embodiment of the invention, the wheel is formed as an integral unit of a lightweight, yet strong material, such as high density polyethylene, high impact styrene, or other suitable plastic. Each wheel is held in place on the axle portion 52 via means (not shown) such as a snap cap which is snapped over the free end of the axle, or a cotter pin extending through an opening at the free end of the axle.

The platform 24 basically comprises a generally planar base member of generally rectangular shape. In particular, the base member comprises a mesh or grid-like central portion 62 defined by plural strip intersecting one another at right angles. The outer periphery of the base 24 is in the form of a frame 64. The frame includes a downwardly extending flanged lip along each side thereof. Thus, the front portion of the base's frame 64 includes a lip 66, the back portion includes a lip 68 (FIG. 2) and the two sides of the basis frame include lips 70 and 72 (FIGS. 1 and 2).

Figure 5:
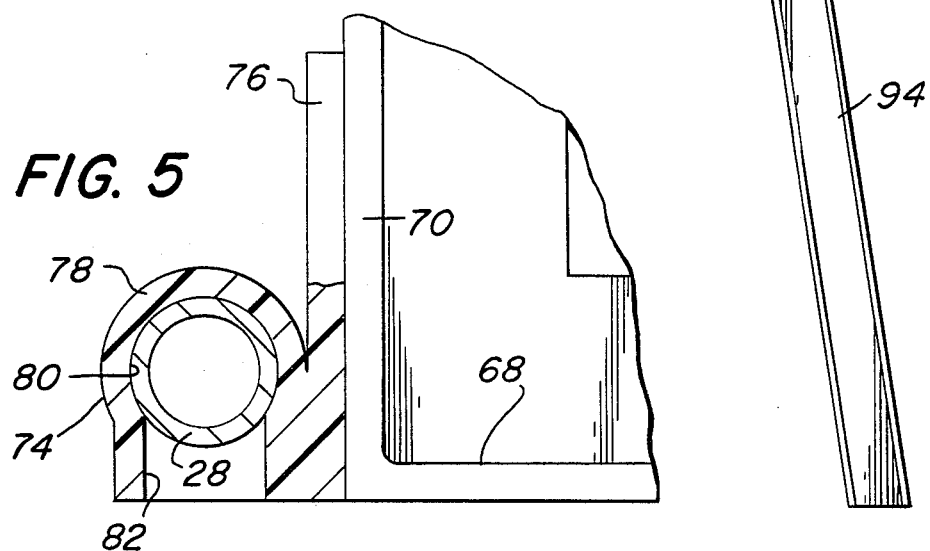
FIG. 5 is an enlarged sectional view taken along line 5—5 of FIG. 3.

Disposed below the base 24 and projecting from the side lips 70 and 72 are a pair of cantilever brackets 74. The brackets are constructed so that one is the mirror image of the other. Hence, only one of the brackets, namely, bracket 74, will be described in detail hereinafter. As can be seen clearly in FIGS. 2, 3 and 5, each bracket 74 includes a generally triangular shaped plate 76 projecting downward from the associated side lip of the base's frame 64. The plate 76 includes an elongated section 78 having a channel 80 (FIG. 5). The channel extends along the full length of member 78 and is of generally cylindrical cross section, whose inside diameter is just slightly larger than the outside diameter of either of the side rails 28 and 30. The channel 80 includes an entrance mouth 82 whose width is less than the outside diameter of either of the cylindrical side rails 28 and 30 of the cart's frame.

The bracket 74 serve to cooperate with the frame sections 28 and 30 to hold the platform in an operative position, wherein the platform is oriented perpendicularly to the frame, to enable the platform to be loaded with objects to be carried by the cart. The platform 24 is pivotably mounted on the frame to enable it to be moved from the operative position to a storage position wherein the platform is disposed in a plane substantially coplanar with the plane defined by the frame 22 of the cart and with the platform resting against rod 36 to be supported thereby.

The means for enabling the platform to be pivoted from the storage position to the operative position and vice versa basically comprises pivot means interconnecting the platform 24 and the frame's side rails 28 and 30. In the preferred embodiment shown herein the pivot means basically comprises a pair of pivot pins 84 and 86 projecting outward from the flanged lips 70 and 72, respectively, of the platform. The pivot pins 84 and 86 are adapted to fit within aligned openings 88 and 90 in the side rails 28 and 30 of the cart's frame and are prevented from sliding out of the holes 88 and 90 via the use of cotter pins 92 (FIG. 1) disposed within holes in the free ends of the pins. Thus, the aligned pins 84 and 86 provide a pivot axis about which the platform 24 can be pivoted from the storage position shown in FIG. 2 to the operative position shown in FIG. 1, and vice versa.

In accordance with the preferred embodiment of this invention, the platform 24, its cantilever brackets 74 and 76 and its pivot pins 84 and 86 are all formed as an integral unit, such as by molding it from a suitable lightweight and strong material, e.g., high density polyethylene, high impact styrene, or some other plastic material.

Figure 4:
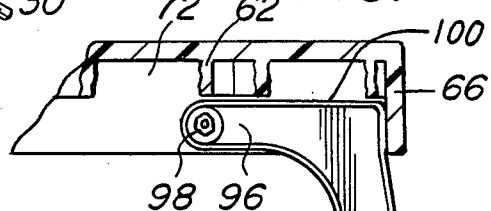
FIG. 4 is an enlarged sectional view taken along line 4—4 of FIG. 3.

In order to facilitate the loading of the platform 24 when it is in its operative position, the cart 20 additionally comprises a pair of legs mounted on the platform 24 adjacent the front lip 66 thereof. The legs 94 are of sufficient length so that when they are extended downward, such as shown in FIG. 1, they engage the floor or other surface on which the cart is located to hold the platform horizontal. As can be seen, each leg 94 basically comprises an elongated member of generally H- shape cross section in the interests of strength. The upper end of each of the legs 94 includes a portion 96 having a laterally located mounting hole 98 therein. The mounting hole serves to receive a bolt or some other means to secure the leg to the platform's side lip in a manner so that the leg can be pivoted upward to the position shown in FIG. 2 to stow the leg when it is not needed. The portion 96 includes a stop surface 100 which is arranged to abut the underside of the platform when the leg is extended into the position shown in FIG. 4 to prevent the overextension of the leg.

In accordance with the preferred embodiment of the invention, the leg 94 is also formed of the same material as that making up the platform and the cantilever brackets.

The loading of the cart 22 is as follows: the platform 24 is pivoted downward from the position shown in FIG. 2 by grasping its front end adjacent lip 66 and pulling it downward. This action causes the platform to pivot via its pins 84 and 86 away from the cart's side rails 28 and 30. When the platform approaches perpendicularly with respect to the frame, the lower end portion of the side rails 28 and 30 enter into the mouths 82 of the cantilever brackets 74. The continued downward pull on the platform causes the channel shape members 78 to open up so that a portion of the side rails 28 and 30 pass through the mouth and into the cylindrical channels 80, whereupon the members 78 snap thereabout to lock those portions of the side rails in place. This action effectively locks the platform in a perpendicular orientation with respect to the frame. The legs 94 can either be extended from their phantom line position shown in FIG. 4 to the solid line position shown therein prior to the pivoting of the platform to the operative position or thereafter. In any event, once the platform is in the operative position with the legs extended downward, the platform will be held in a horizontal orientation so that any articles to be transported by the cart can be loaded thereon. Conventional elastic or other material cords can be used to secure the objects on the platform.

As will be appreciated by those skilled in the art, the angled plate sections 76 of the cantilever brackets provide considerable reinforcement to the platform to ensure that is does not sag downward under the weight of the load disposed thereon. The grid-like nature of the platform, while being light in weight, also provides substantial resistance to flexing or deformation of the platform under a load.

As can be seen in FIG. 1, a hook 102 can be suspended from the upper brace member 34. The hook 102 can serve as a means for suspending articles therefrom. Thus, when the device is used as a beach carrier, the hook 102 can serve as a means for holding a beach bag, a pocketbook, etc.

In the interest of further utility, the cart 22 includes means for supporting an umbrella thereon. Thus, the side rail 28 includes a cup-like member 104 mounted thereon adjacent its lower end and a hook-like clasping member 106 mounted at the top portion of the side rail 28. The cup-shaped member is arranged to receive the top end of a collapsed umbrella therein, with the umbrella extending along the side rail 28. The upper hook or clasp element 106 is arranged to encircle the upper end of the umbrella to hold it in place.

If desired the frame 22 may include webbing (not shown) disposed thereacross, that is, between the side rails 28 and 30 for aesthetic appeal. Thus, such webbing may carry graphics or advertising and promotional materials thereon.

Moreover, in accordance with another preferred aspect of this invention, a pocket or bag 110 may be mounted on the frame 22 to hold articles therein. In such an arrangement, the frame 22 is modified to eliminate the rods 34 and 36. A hollow bag (not shown) of at least the width of the frame 22 and having a pair of openings in its bottom and spaced apart by the spacing of the side rails 28 and 30 is slid up the side rails before the cart 20 is assembled. The bag includes a loop-like handle at its top and through which one of the side rails 28 or 30 is threaded before the bag is slid up the rails. Thus, when the bag is slid up the rails, the handle (loop) of the bag can be extended over the top of the handle 32 of the frame. This arrangement holds the bag in place adjacent the top of the frame.

FIGS. 7-10 show an alternative preferred embodiment of the cart. This embodiment is intended to increase the utility of the cart as well as the cart's strength and stability.

Figure 6:
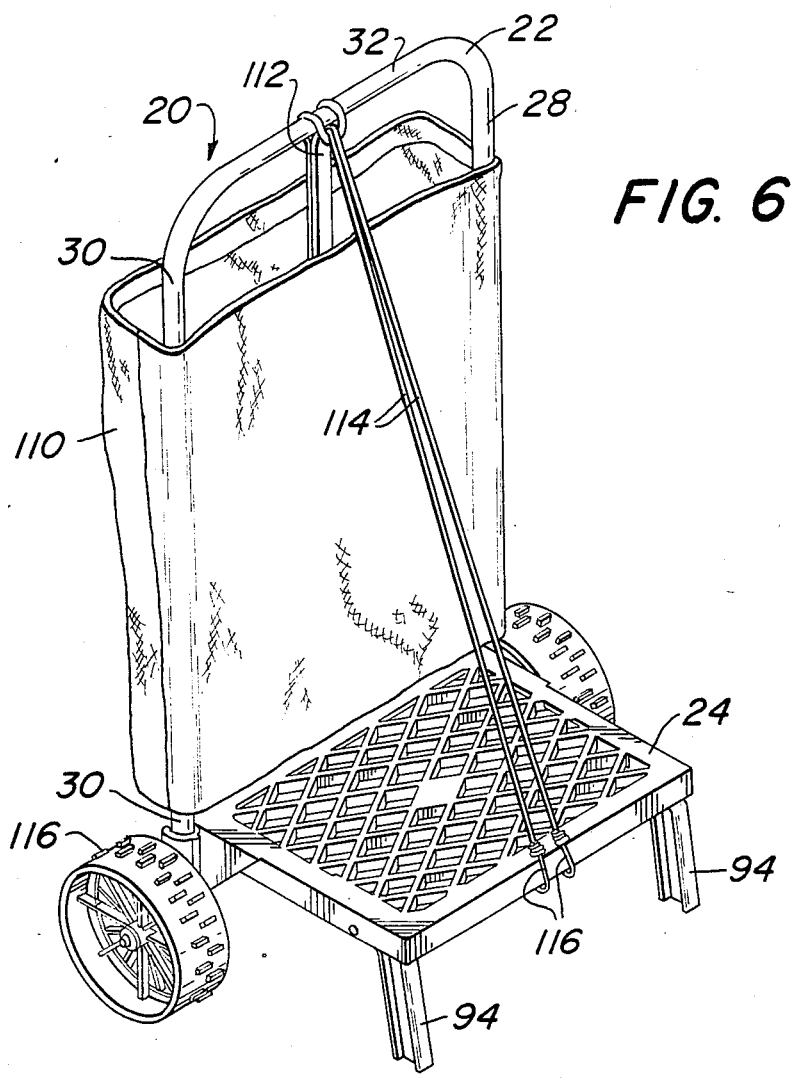
FIG. 6 is a perspective view of an alternative embodiment of the hand truck/cart.

As shown in FIG. 6, which is a perspective view of the alternative embodiment, a bag 110 is slipped over the frame 22 and attached to the handle 32 by means of a strap 112. The bag 110 has holes at the sides of its lower end to allow the bag 110 to be slipped over the side rails 28 and 30 and positioned over the frame 22.

With the inclusion of the bag 110, the rods 34 and 36, the hook 102, the cup-like member 104, and the clasping member 106, (see FIGS. 1 and 2) are no longer used. The bag 110 may be used to carry miscellaneous and sundry items, such as clothing, shoes, bags, lotions, towels, and the like.

In addition, the alternative embodiment includes an elastic cord 114 with hooks 116 attached to each end. The elastic cord 114 prevent objects which have been placed upon the platform 24 from sliding off. Also, when the platform 24 is placed in its retracted position (FIG. 2), the elastic cord 114 holds the platform 24 in its upright position substantially parallel to the frame 22, when the hooks 116 are attached to axle 50.

Moreover, as can be seen in FIG. 6, the wheels 116 have been widened to approximately twice the width of the wheels 26 in the original embodiment as shown in FIGS. 1 and 2. The wheels 116 are approximately three inches in width with the clear area about one and one-half inches in width. This enables the use of the cart, even when heavily loaded, in deep, loose sand, loose earth, or on muddy terrain.

Referring now to FIGS. 7-9, FIG. 7 is a perspective view of a portion of the hand truck/cart shown in FIG. 6 which shows the details of the underside of the platform 24. FIG. 8 is a sectional view of the bracket 74 encompassing side rail 28 taken along the line 8—8 of FIG. 7. In the alternative embodiment, beads 118, which extend along the length of bracket 74, have been added at the entrance mouth 82 of the channel 80. The beads 118 insure a tight, stable snap fit of the side rail 28 within the brackets 74 when the platform is placed in its horizontal operating position.

Figure 10:
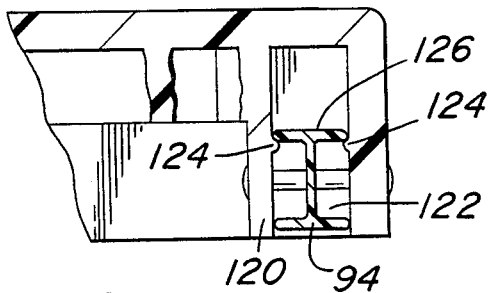
FIG. 10 is an enlarged sectional view taken along the line 10—10 of FIG. 9.

FIG. 9 is a partially exposed enlarged sectional view taken along the line 9—9 of FIG. 7 with the leg 94 shown in its extended position. FIG. 10 is an enlarged sectional view taken along the line 10—10 of FIG. 9. Brackets 120 have been added to underside of the platform 24 to form channels 122 into which the legs 94 are fitted when the legs 94 are extended for use. Beads 124, which extend along the length of the channels 122, are disposed on the upper, inner portions of channel 122 to assure a tight and stable fit when the legs 94 are snapped into their extended position. As can be seen in FIG. 10, upper lips 126 of the legs 94 extend above the beads 124 thereby locking the legs 94 firmly into position.

Thus, in the alternate preferred embodiment the carrying bag 110 has been included for added convenience; the elastic cord 114 with the hooks 116 are used to prevent packages from slipping off platform 24 and to hold the platform in its vertical position when the platform is retracted; extra wide cleated wheels 116 are used to add greater stability and utility in soft or deep sand, loose soil, or muddy terrain; the beads 118 have been added to the channel 80 of the brackets 74 to securely lock the platform in position when the platform is lowered for use; and the brackets 120 have been added to form channels with beads 124 to securely lock the legs 94 into position when they are extended for use.

As will be appreciated by the foregoing, the hand truck/cart of the subject invention is simple in construction, can be made of relatively lightweight materials, yet is sufficiently strong to transport a large volume or weight of objects thereon. Moreover, the construction of the platform and its cantilever brackets is such as to prevent the platform from sagging or otherwise deforming under the load. Thus, the cart can serve as a trash hauling cart. The wheels are constructed and are mounted with respect to the platform so that the cart can be readily rolled over sand or other soft surfaces to enable the transportation of objects to beaches or other locations heretofore inaccessible.

Without further elaboration the foregoing will so fully illustrate our invention that others may, by applying current or future knowledge, adopt the same for use under various conditions of service.

I claim:

1. A cart for transporting objects onto beaches or other soft surfaces, said cart comprising frame means, a pivotable support platform, and at least two wheels, said frame means including a pair of elongated side rail members each having an upper end portion including handle means and a lower end portion through which an axle passes, said pair of wheels being mounted on said axle, said pivotable support platform comprising a generally planar member having a pair of sides, pivot means establishing a horizontal pivot axis and being coupled to said sides to enable said platform to be pivoted about said axis from a storage position wherein said platform is substantially flush with said frame means to an operative position wherein said platform extends substantially perpendicularly to said frame means, said platform including an underside, having a pair of side lips, and a pair of cantilever brackets disposed therebelow, each of said brackets including an elongated section having a channel therein and being adapted to receive in said channel a respective one of said elongated side rails to hold said platform in its operative position, whereupon said objects can be placed thereon and solidly supported thereby, said cart also comprising at least two support legs, each leg being pivotably attached to said side lips of said platform and being individually retractable and extendable and comprising an upper section with a stop surface which abuts the underside of said platform to prevent overextension of the leg when said leg is placed in its extended position, said cart further comprising a bag installed over said frame means and attached to said handle means for carrying objects, said brackets of said side rails being of circular cross section and each channel in each of said brackets being of generally circular cross section with an entrance mouth and each of said channels comprising beads disposed adjacent said entrance mouth and along the length of said channel, said beads locking said side rails into said channels when said platform is in its operative position, said cart further comprising a second set of brackets connected to said underside of said platform, each of said second set of brackets having an inner surface facing said side lips and being positioned to form a second channel between each of said second set of brackets and each of said side lips of said platform, to receive said legs when said legs are extended, said cart further comprising a second set of beads, each of said beads being disposed along the length of the inner surface of each of said second set of brackets and being disposed on each of said side lips opposite said beads on each of said brackets, said beads being parallel to said platform, the space between said beads being less than the width of said upper section of said legs, so that when said legs are extended, said upper section is forced passed said rows of beads in a snapping action, locking said legs into position.

2. The cart of claim 1 wherein said cart further comprises an elastic cord attached to said handle means and having a hook at each end which may be attached to said platform to prevent said objects from slipping off said platform when said objects are being transported and wherein said hooks may be attached to said axle to hold said platform in position when said platform is in a storage position.

3. The cart of claim 2 wherein each of said pair of wheels comprise a plurality of elongated cleats projecting from the periphery thereof, and each of said cleats extends along an axis parallel to the axis of rotation of said wheels, and wherein each of said wheels is approximately three inches in width to permit the transporting of said objects by said cart in deep, loose sand or soil or deep mud.

* * * * *